United States Patent [19]

Yamamoto

[11] 4,226,483
[45] Oct. 7, 1980

[54] HYDROSTATIC BEARING COMPONENT

[75] Inventor: Hironori Yamamoto, Yokohama, Japan

[73] Assignee: Canon Kabushiki Kaisha, Tokyo, Japan

[21] Appl. No.: 952,980

[22] Filed: Oct. 20, 1978

[30] Foreign Application Priority Data

Oct. 21, 1977 [JP] Japan .................. 52-126503

[51] Int. Cl.³ .................. F16C 7/04; F16C 32/06
[52] U.S. Cl. ......................................... 308/9
[58] Field of Search ............. 308/3 R, 5 R, 9, DIG. 1

[56] References Cited

U.S. PATENT DOCUMENTS

| 3,719,405 | 3/1973 | Izumi | 308/9 |
| 3,799,628 | 3/1974 | Hakkenberg | 308/5 R |
| 4,035,037 | 7/1977 | Cunningham | 308/9 X |

Primary Examiner—Frederick R. Schmidt
Attorney, Agent, or Firm—Fitzpatrick, Cella, Harper & Scinto

[57] ABSTRACT

A hydrostatic bearing component for reserving pressurized fluid in its one portion facing the surface of a supporting member. The component is provided with a recess to serve as a passage for the pressurized fluid, an orifice open to the recess, and a pressure supply communicating to the orifice, a ratio ($\beta$) of a clearance $C_s$ between the surface of the bearing component and the supporting surface to a clearance $C_R$ between the bottom surface of the recess and the supporting surface $\beta = C_s/C_R$ being set in a range between 0.2 and 0.7.

7 Claims, 9 Drawing Figures

HYDROSTATIC BEARING COMPONENT

BACKGROUND OF THE INVENTION

1. Field of the Invention

This invention relates to a lubricating device, and, more particularly, it is concerned with a device utilizing a compressive or non-compressive fluid fed from an external pressure device for lubrication of two opposing surfaces which move relatively.

2. Description of the Prior Art

Heretofore, a hydrostatic bearing using a compressive fluid such as air has been utilized in precision machine tools, and a hydrostatic slider has also been employed in various measuring instruments and forwarding mechanism in machine tools. The reason for this is that, in comparison with contact type sliders, in which rollers and metal parts are directly contacted with each other in operation, the abovementioned fluid slider is of the type which does not contact with a supporting member, hence smooth operation can be secured with the least friction between them and precision in machining work can be increased. On the other hand, however, the fluid bearing and slider inherently possess various disadvantages such that they are inferior in load sustaining capability in comparison with the contact type bearing, and that the bearing action becomes unstable when a gap between the bearing and the supporting member becomes widened in case a compressive fluid such as air is used in particular, as the result of which the so-called self-excited vibrations, wherein the bearing vibrates in the up and down direction, tend to occur readily.

SUMMARY OF THE INVENTION

It is an object of the present invention to provide a hydrostatic bearing component having increased stiffness which is a ratio of variations in clearance of a gap to a load to be imposed.

It is another object of the present invention to provide the hydrostatic bearing member, in which self-excited vibrations due to fluid are prevented.

In order to attain the above objectives, the present invention proposes to provide a shallow recess in one side of the bearing body facing the surface of a supporting member, and to form an orifice in this recessed part so that a gap formed between the top surface of a stepped part defining the recess and the confronting surface of the supporting member may restrict flow of the fluid to be discharged outside through the gap.

DESCRIPTION OF THE PREFERRED EMBODIMENTS

Figure 1:
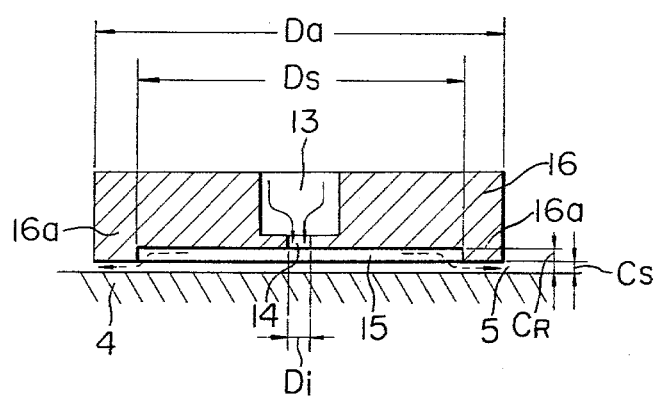
FIG. 1 is a cross-sectional view of one embodiment of the hydrostatic bearing component according to the present invention.

Before going into details of the preferred embodiment of the present invention, various defects inherent in the known bearing components will be commented on with reference to the drawing.

Figure 7:
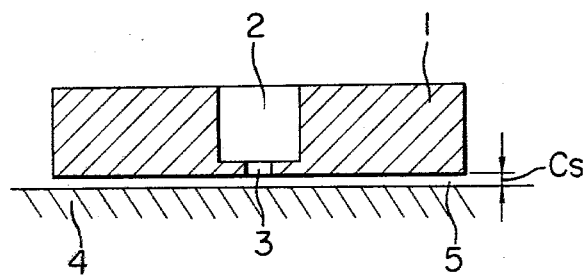
FIGS. 7, 8 and 9 are respectively cross-sectional views of well known gas bearings.
Figure 8:
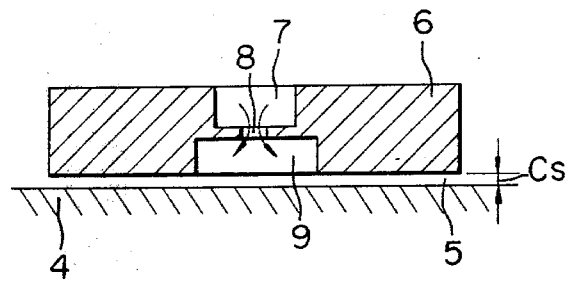
Figure 9:
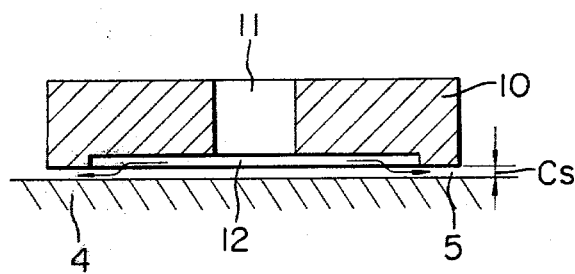

FIGS. 7 to 9 illustrate the fluid bearings known so far. It should be understood that, for the purpose of explanations hereinbelow, air is used as the fluid, and a circular pad member as the fluid bearing component.

FIG. 7 shows a cross-section of the fluid bearing 1, in the form of a circular pad in which the flow of air is restricted at its entrance or inlet part. In the illustration, air which has been pressurized to an arbitrary pressure $P_O$ is fed to a pressure supply 2, and then is restricted in its flow quantity by an orifice 3. Thereafter, it is ejected outside of the bearing through a gap 5 between the fluid bearing pad 1 and a supporting member 4 such as a guide or a shaft. The gap is set at a value of the order of a few $\mu$m. In this construction, there is no way of restricting the air flow quantity other than by viscosity of the air, until the air reaches the discharging section of the bearing pad through the gap 5, after its flow has been restricted at the orifice 3. Accordingly, the pressure within the gap 5 abruptly decreases toward the exit with the consequence that a ratio of the load to variations in the clearance $C_s$ of the gap 5 (hereinafter referred to as "stiffness") and the maximum load (hereinafter referred to as "load capacity") become extremely low, hence it is not appropriate for practical use.

FIG. 8 is a cross-section of an improvement in the fluid bearing pad shown in FIG. 7. A fluid bearing pad 6 has a pressure supply 7 of air, an orifice 8, and a sinkage 9. The air which has been taken into the pressure supply 7 and restricted in its flow by the orifice 8 at the entrance of the bearing pad 6 expands in the sinkage 9 as shown by arrows in the drawing to exhibit its effect of restriction at the entrance. As the consequence, the bearing pad increases its pressure sustaining capability in comparison with the fluid bearing pad in FIG. 7, whereby its stiffness increases. However, since the internal capacity of the sinkage is large, there tends to occur turbulence at the time of expansion of the air. This air turbulence causes self-excited vibrations, by which operations of the bearing pad become disadvantageously unstable FIG. 9 shows another example of the bearing pad, in which the air flow is restricted at the exit thereof for the purpose of increasing its pressure sustaining capability and stiffness. In the illustration, air flowing into a pressure supply 11 of the fluid bearing pad 10 directly acts on the surface of the supporting member 4 under a pressure substantially equal to the supply pressure of the air throughout the entire recess 12 formed in the lower part of the fluid bearing pad 10. In this instance, the air within the recess is restricted in its flow when it passes through a gap 5 between the bearing pad 10 and the supporting member 4 (as shown by arrows). By this restricting effect of the air flow at the exit, the pressure within the recess 12 can be maintained.

In the bearing pad of the abovementioned construction, the pressurized air is forwarded to the recess 12 without being restricted in its flow. As the gap 5 becomes widened, the air flow quantity increases, and the bearing pad becomes unstable in its operations to disadvantageously bring about the self-excited vibrations.

For the sake of good understanding, the diameter of the orifice, depth of the recess, and a clearance in the gap between the bearing pad and the supporting member in the diagrammatic illustrations in FIGS. 7, 8 and 9 are drawn up in an exaggerated scale. The actual diameter of the orifice is less than a millimeter, and the depth of the recess and the clearance of the gap are for the order of a few μm.

Referring now to FIG. 1, air which has been pressurized to a predetermined pressure value greater than the atmospheric pressure is forwarded to a pressure supply 13 from a compressor through a feeding device such as piping, etc. (not shown). Subsequently, the air is restricted in its flow at the entrance by an orifice 14 (as shown by arrows in solid lines), and then reaches a recess 15 through this orifice. Relationship between the diameters of the bearing pad and the orifice is such that when the former is 50 mm in diameter, the latter should preferably be 0.5 mm and below. Depth of the recess 15 is set substantially the same as the clearance $C_s$ of the gap 5, which is usually of the order of a few μm. By thus constructing the fluid bearing pad according to the present invention, the air flow can be restricted at a stepped part 16a which defines the recess 15, and the effect of restricting the air flow at the exit is obtained.

Now assume that, in the illustrated structure, a clearance of the gap 5 is $C_s$, a distance from the surface of the supporting member 4 to the bottom of the recess 15 is $C_R$, a diameter of the orifice is $D_i$, a diameter of the recess 15 is $D_s$, and a diameter of the fluid bearing pad is $D_a$. It has been verified that the optimum air-flow restricting effect at the exit can be obtained when a ratio between the clearance $C_s$ of the gap 5 and the distance $C_R$ to the bottom of the recess 15 is represented by $\beta = C_s/C_R$, and $\beta$ is set in a range from 0.2 to 0.7. In case the clearance $C_s$ of the gap 5 and the depth of the recess 15 are equal, $\beta$ is 0.5. Further, it is considered that the wider the diameter $D_s$ of the recess is, the higher becomes the pressure sustaining capability of the bearing pad 16, although it may be better to set the recess diameter in relation to the orifice diameter for the inlet restriction of the air flow. It is preferable that, when a ratio between the two diameters is represented by $\lambda = l_n(D_a/D_s)/ln(D_s/D_i)$, the value of $\lambda$ be in a range of from 0.02 to 0.06. Although, in the foregoing, it has been mentioned that the diameter $D_i$ of the orifice 13 may preferably be 0.5 mm and below, it has been verified that the optimum value thereof is $0.001 \leq \alpha(=D_i/D_a) \leq 0.01$, when the ratio is considered in relation to a diameter $D_a$ of bearing pad 16.

Figure 2:
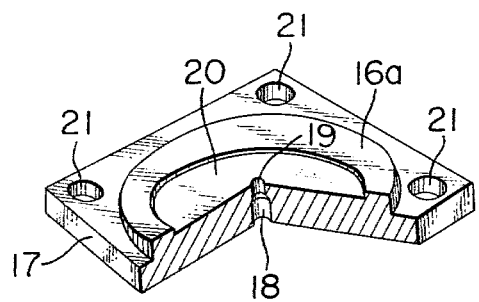
FIG. 2 is a perspective view of the bearing component shown in FIG. 1.

FIG. 2 is a perspective view of a sliding component, in which a reference numeral 18 designates a pressure supply, 19 an orifice like a fixed throttle valve, and 20 a recess. Also, a numeral 16a refers to a circular stepped part defining the recess, and 21 holes for fixing the bearing component, FIGS. 3 and 4 respectively show the measured results of load characteristics and pressure distribution of the bearing pad as shown in FIG. 7, in which the fluid flow is restricted only at its entrance, of the bearing pad as shown in FIG. 9, in which the fluid flow is restricted only at its exit, and of the bearing pad according to the present invention, in which the fluid flow is restricted at both entrance and exit. For the sake of uniformity, the size-denomination of each part of the bearing pad in FIGS. 7 and 9 are the same as those in FIG. 1 (e.g., the diameter of the orifice is denoted by $D_i$). Also, for the sake of uniformity in the measuring conditions, the diameter $D_a$ of the bearing pad is set at 50 mm, the clearance $C_s$ of the gap at 5 μm, and the pressure of the air to be supplied at 5 atmospheres.

Figure 3:
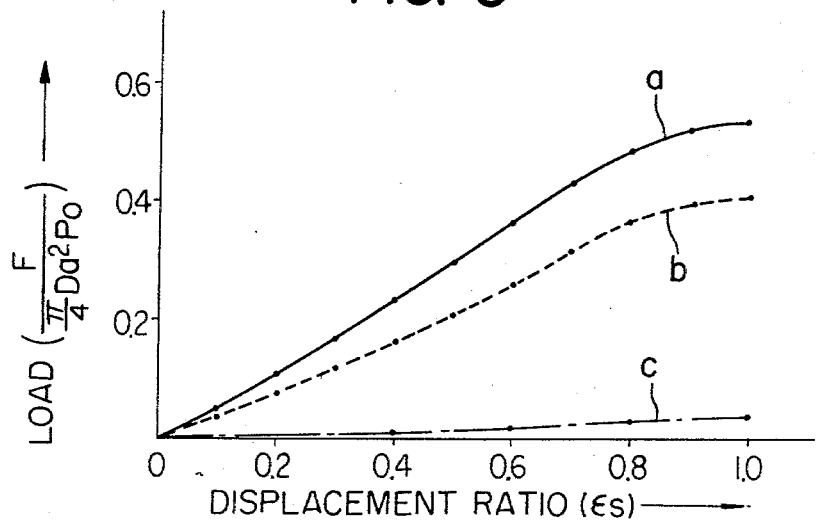
FIG. 3 is a graphical representation showing a relationship between a displacement ratio of a gap and a load.

FIG. 3 is a graphical representation showing the displacement ratio v. load characteristics with the load $F/(\pi D_a{}^2 P_O/4)$ being on the ordinate and the displacement ratio $\epsilon_s = \Delta h/C_s$ of the small displacement $\Delta h$ to the set clearance $C_s$ of the gap on the abscissa. This graphical representation indicates that, when the bearing pad for restricting the fluid flow at both inlet and outlet is used, it can withstand against approximately 53% of the load out of the total pressure supplied, when the gap between the bearing pad and the supporting body disappears (i.e., $\Delta h = C_s, \epsilon_s = 1$), as shown by the curve a. In the same manner, the bearing pad as shown in FIG. 9 for restricting the fluid flow at the exit, as shown by the curve b can withstand against approximately 40% only of the load in case of $\epsilon_s = 10$. It is seen further that the bearing pad as shown in FIG. 7 to restrict the fluid flow at the inlet alone can hardly withstand the load as shown in the curve c. In other words, use of the bearing pad according to the present invention reduces variations in the clearance of the gap with respect to the same load as that imposed on the outlet restricting pad and the inlet restricting pad, hence its stiffness increases. In other words, comparing it to a spring, a highly resilient spring can be obtained, whereby stable load sustaining becomes always possible. Incidentally, the values of $\alpha$, $\beta$ and $\lambda$ in each bearing pad have been set respectively as follows: (i) in the case of the inlet-outlet restricting type bearing pad according to the present invention . . . $\alpha = 0.004$, $\beta = 0.5$ and $\lambda = 0.055$; (ii) in the outlet restricting type bearing pad as shown in FIG. 9 . . . $\alpha = 0.08$, $\beta = 0.5$ and $\lambda = 0.055$; (iii) in the inlet restricting type bearing pad as shown in FIG. 7 . . . $\alpha = 0.004$, $\beta = 1$ (depth of the recess $= 0$).

Figure 4:
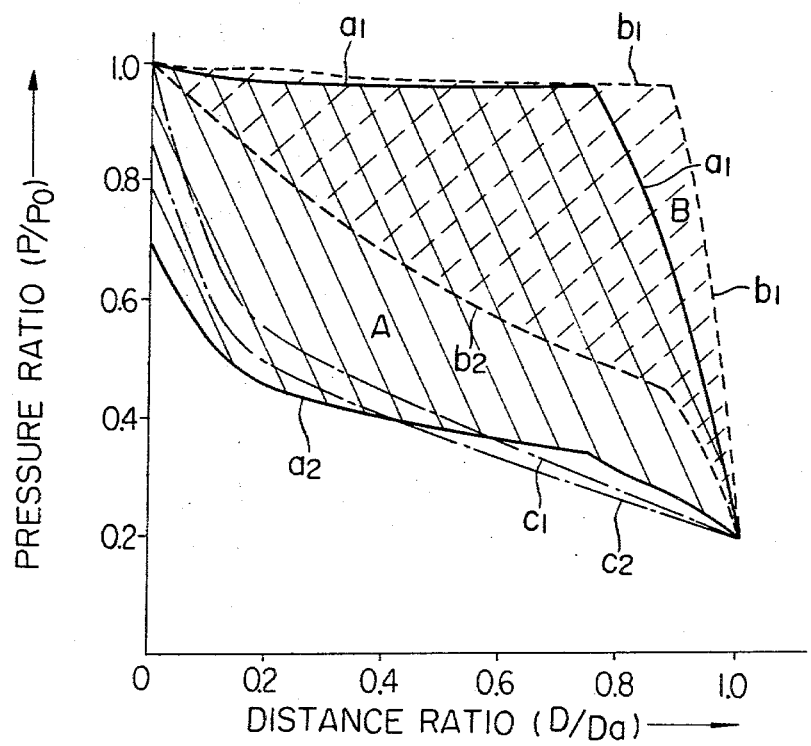
FIG. 4 is also a graphical representation showing a pressure distribution within a recess.

FIG. 4 is a graphical representation showing the pressure distribution of the abovementioned three examples of the bearing pad in the case of $\epsilon_s = 0.8$, i.e., when the clearance of the gap has been displaced at a rate of 80% with respect to the set clearance. In this graphical representation, the abscissa represents a ratio of a distance $D/2$ from the center of the bearing pad to its periphery to the radius $D_a/2$ of the circular bearing pad, and the ordinate represents a ratio $P/P_O$ of the pressure P at a point of distance $D/2$ to the supply pressure $P_O$. Of the two curves in solid lines, the curve $a_1$ represents a load side pad of the bearing pad according to the present invention, and the curve $a_2$ represents the non-load side pad. Similarly, of the two curves in dotted lines, the curve $b_1$ represents the load side pad of the bearing pad shown in FIG. 9, and the curve $b_2$ represents the non-load side pad. Further, of the two curves in dot-and-dash lines, the curve $c_1$ represents the load side pad of the bearing pad shown in FIG. 7, and the curve $c_2$ represents the non-load side pad. As is apparent from the graphical representation, in the case of the inlet restricting bearing pad as shown in FIG. 7, there is no substantial pressure difference between the load side pad ($c_1$) and the non-load side pad ($c_2$), hence it cannot withstand the load, as shown in FIG. 3. The value of the pressure ratio at the load side in both bearing pad of the present invention and that shown in FIG. 9 is almost the same. At the non-load side, however, the pressure ratio of the bearing pad according to the present invention is remarkably lower than the outlet restricting type bearing pad in FIG. 9. It is only 0.7 just beneath the orifice. The reason for this appears to be such that, when a load is applied, the gap in the non-load side pad becomes wider than the depth of the recessed portion, and, moreover, the air flow quantity is restricted at the inlet, on account of which the air jets out of the widened gap to become able to lower the pressure at the non-load side. Accordingly, when the bearing pad is constructed in such confining structure, the pressure difference between the load side pad and the non-load side pad produces a force to sustain the load. Therefore, in the case of the inlet-outlet restricting type bearing pad according to the present invention, the diagonally hatched area A in solid lines constitutes the pressure difference to produce the sustaining force, while, in the case of the outlet restricting type bearing pad as shown in FIG. 9, the diagonally hatched area B in dash lines alone produces such sustaining force. In this instance the value of λ is set at 0.055 for both cases so as to unify the measuring conditions.

In addition, the present invention carries out the air flow quantity restriction at the inlet, and the air flow restriction at the exit to maintain the air pressure. Therefore, the bearing pad of the invention is fundamentally different in construction and function from the bearing pad shown in FIG. 9, in which the pressure is maintained by the inlet restricting effect by provision of the sinkage. That is, in order to maintain the pressure by expansion of the air in the sinkage, its internal capacity should be large, for which purpose depth of the sinkage should be at least a few hundred μm and above. This shows a difference of approximately 100 times in comparison with the gap of a few μm set between the bearing pad and the supporting member. Accordingly, unlike the case of the air within the recess of the bearing pad according to the present invention, the quantity of the air within the sinkage does not much vary by very small variations in the gap. In other words, the sinkage has no effect of the outlet restriction of the fluid flow except for the inlet restricting effect, so that, even when the bearing pad is disposed either to the load side or to the non-load side, it draws the same pressure dropping curve as the curves $c_1$ and $c_2$ in FIG. 4, whereby no sufficient pressure difference can be produced.

Figure 5:
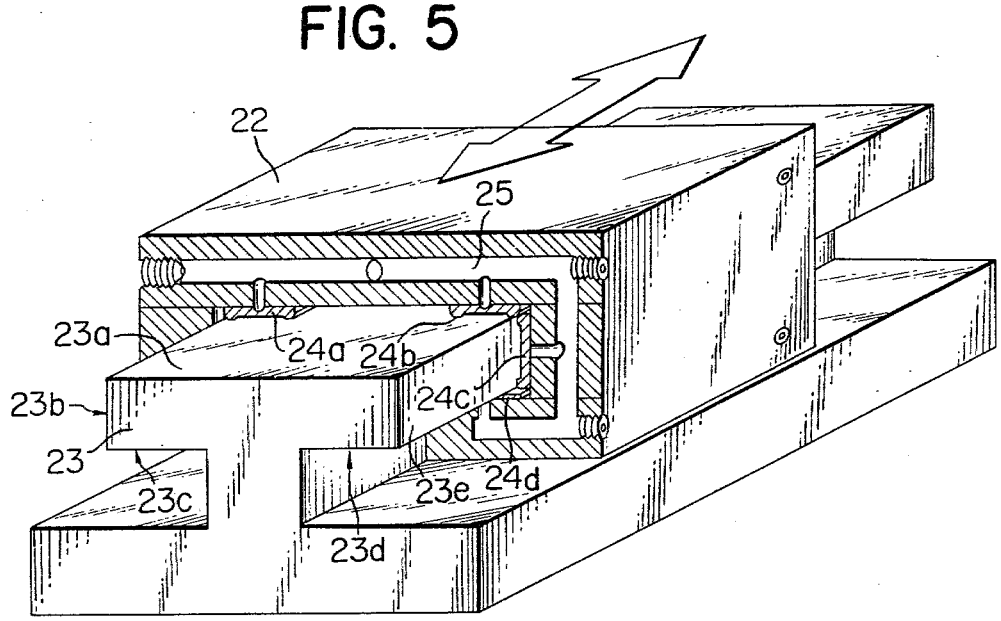
FIG. 5 is a perspective view of a sliding device using the hydrostatic bearing component shown in FIG. 1.

FIG. 5 illustrates an actual embodiment of the sliding device. A reference numeral 22 designates a movable body, and 23 a T-shaped guide. The guide 23 has flat surfaces 23a to 23e extending in the moving direction of the body 22. In the internal wall of the body 22, there are provided a plurality of the hydrostatic bearing components shown in FIG. 2, each being in confrontation to each of the surfaces 23a to 23e. In this instance, the gap between the surface of the guide 23 and the top surface of the stepped part 16a of each of the bearing components is adjusted as to be maintained at a few μm. The pressure supply 18 in each of the bearing components is communicatively connected with an air supply passage 25 which, in turn, is connected to an air pressure pump (not shown). In this structure, pressurized air flowing through the air supply passage 25 enters into the orifice 19 through the pressure supply 18. In the orifice, the air is restricted in its flow to produce a high pressure, and flows through a gap between the recess 20 and the guide 23. Subsequently, the air is discharged from the gap between the top surface of the stepped part 16a and the guide 23. However, as the clearance between these surfaces is extremely narrow, there is no possibility of the air discharged out of the orifice to reduce its pressure within the recess.

The above-described action works in all of the bearing components, whereby the movable body 22 is held with a very small gap being provided between it and the guide 23, and is able to slide in the longitudinal direction of the guide 23. If there should be applied a heavy load to the top part of the body 22, the stepped parts of the bearing components 24a and 24b come closer to the surface 23a of the guide 23. In this case, as the gap between the top surface of the stepped parts and the surface of the guide becomes much narrower, the air flowing through this gap is more remarkably restricted, whereby the pressure in the recess increases to prevent the stepped parts from contacting the guide surface.

Figure 6:
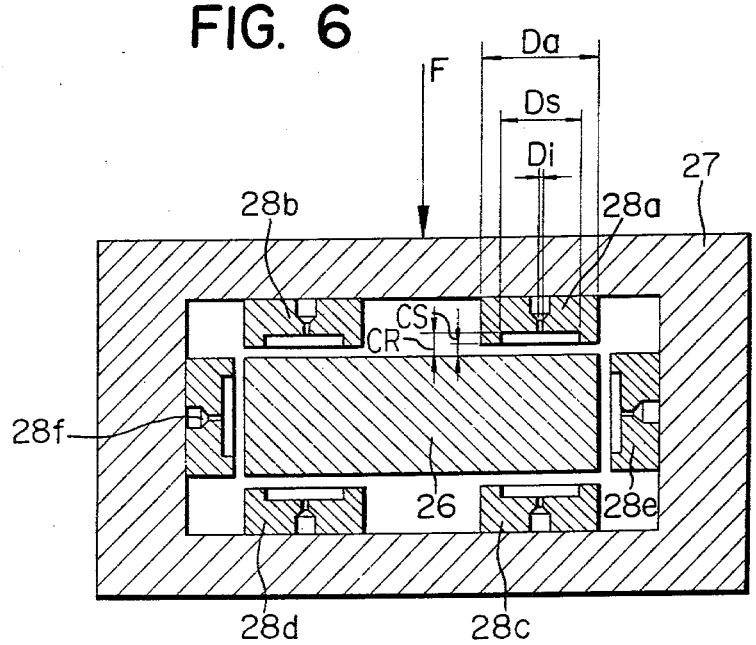
FIG. 6 is a cross-sectional view of another sliding device using the hydrostatic bearing component in FIG. 1.

FIG. 6 illustrates a sliding device of a confining type, in which a reference numeral 26 designates a guide and 27 a movable body. It is, of course, possible that the body 27 is fixed, and the guide 26 is made movable in the direction normal to the surface of the drawing sheet. In this concrete example, too, each surface of the guide 26 extends in the direction perpendicular to the drawing sheet. Facing to these guide surfaces, bearing components 28a to 28e are fixed to the internal wall of the movable body 27. Even in this case, the clearance $C_s$ between the surface of the guide 26 and the top surface of the stepped part should be adjusted with care. Provision in the internal wall of the movable body 27 of the bearing components 28a and 28c, 28b and 28d, and 28e and 28f, respectively, in a manner to enclose the guide 26 serves to cause the movable body 27 to move with good stability. Further, provision of a plurality of the bearing components in the direction normal to the drawing sheet also serves to improve its stability.

What I claim is:

1. Hydrostatic bearing component, comprising first and second relatively movable members, said first movable member having a recess defined therein by stepped means at a side facing said second member, at least one orifice open to said recess, and a pressure supply communicating with said orifice, a ratio ($\beta$) of a gap $C_s$ between said stepped means and said second member to a gap $C_R$ between the bottom surface of said recess and said second member ($\beta = C_s/C_R$) being in a range of between 0.2 and 0.7 when pressurized fluid is supplied to said pressure supply, and wherein a value λ defined by $(\ln D_a/D_s)/(\ln D_s/D_i)$, where $D_a$ is a diameter of said first member, $D_s$ is a diameter of said recess, and $D_i$ is a diameter of said orifice, is in a range of between 0.02 and 0.06.

2. Hydrostatic bearing component as set forth in claim 1, wherein a value of α to be defined by $D_i/D_a$ is set in a range between 0.001 and 0.01.

3. Hydrostatic sliding device comprising:
    (a) first means having a plurality of flat supporting planes extending in one direction; and
    (b) second means provided with at least one hydrostatic bearing component facing each of said supporting planes,
    said each component having a recess continuously enclosed by a stepped part, at least one orifice open to said recess, and a pressure supply communication with said orifice, a value λ defined by $(\ln D_a/D_s)/(\ln D_s/D_i)$, where $D_a$ is a diameter of said component, $D_s$ is a diameter of said recess, and $D_i$ is a diameter of said orifice, is in a range of between 0.02 and 0.06.

4. The device as set forth in claim 3, wherein said hydrostatic bearing component is in circular form, and depth of said recess is in the order of μm.

5. The device as set forth in claim 3, wherein said supporting planes comprise mutually parallel planes.

6. The device as set forth in claim 3, wherein a ratio ($\beta$) of a gap $C_s$ between said stepped part and said supporting plane to a gap $C_R$ between the bottom surface of said recess and said supporting plane ($\beta = C_s/C_R$), when pressurized fluid is supplied to said pressure supply, is set in a range of between 0.2 and 0.7.

7. The device as set forth in claim 3, wherein a value of $\alpha$ to be defined by $D_i/D_a$ is set in a range between 0.001 and 0.01

* * * * *